United States Patent [19]

Nakatani

[11] Patent Number: 5,896,525
[45] Date of Patent: Apr. 20, 1999

[54] MICROCOMPUTER WITH CONTROLLER OPERATING IN SYNCHRONISM WITH EXTERNAL SYNCHRONOUS SIGNAL

[75] Inventor: Kenji Nakatani, Kanagawa, Japan

[73] Assignee: NEC Corporation, Tokyo, Japan

[21] Appl. No.: 08/954,609

[22] Filed: Oct. 20, 1997

[51] Int. Cl.$^6$ .................................................. G06F 1/04
[52] U.S. Cl. ................................. 395/560; 345/99
[58] Field of Search ........................ 395/551, 552, 395/559, 560; 348/540, 525, 533; 345/94, 99, 204, 208

[56] References Cited

U.S. PATENT DOCUMENTS

| | | | |
|---|---|---|---|
| 4,246,578 | 1/1981 | Kawasaki et al. | 340/750 |
| 5,615,376 | 3/1997 | Ranganathan | 395/750 |
| 5,726,677 | 3/1998 | Imamura | 345/99 |
| 5,821,910 | 10/1998 | Shay | 345/99 |

FOREIGN PATENT DOCUMENTS

| | | | |
|---|---|---|---|
| 2 549 330 | 1/1985 | France | H04N 5/262 |
| 6-51727 | 2/1994 | Japan . | |
| 8-006546 | 1/1996 | Japan | G09G 5/40 |
| WO 84/00236 | 1/1984 | WIPO | G09G 1/16 |

OTHER PUBLICATIONS

Japanese Office Action dated Jul. 7, 1998, with English language translation of Japanese Examiner's comments.

*Primary Examiner*—Dennis M. Butler
*Attorney, Agent, or Firm*—Whitham, Curtis & Whitham

[57] ABSTRACT

In a microcomputer internally comprising a circuit including a CPU and operating in synchronism with an internal clock signal, and an OSD controller operating in synchronism with the internal clock signal and an external horizontal synchronous signal, an oscillation circuit is coupled to an external oscillator, for generating the internal clock signal used in common to the circuit and the OSD controller. An oscillation control circuitry receives the horizontal synchronous signal for generating a CPU stop request signal to the circuit before supply of each horizontal synchronous signal, so that the circuit generates a CPU stop signal after a stopping processing is completed. When the oscillation control circuitry receives the CPU stop signal, the oscillation control circuitry causes the oscillation circuit to stop generation of the internal clock signal. Thereafter, in response to each horizontal synchronous signal, the oscillation control circuitry causes the oscillation circuit to restart the generation of the internal clock signal. As a result, the internal clock signal is generated in synchronism with the horizontal synchronous signal.

8 Claims, 6 Drawing Sheets

MICROCOMPUTER WITH CONTROLLER OPERATING IN SYNCHRONISM WITH EXTERNAL SYNCHRONOUS SIGNAL

BACKGROUND OF THE INVENTION

1. Field of the Invention

The present invention relates to a microcomputer, and more specifically to a microcomputer internally including a controller operating in synchronism with an external synchronous signal.

2. Description of Related Art

In the prior art, a microcomputer of this type is widely incorporated for control in a product accompanied by a "on screen display" (abbreviated to "OSD" hereinafter) in a CRT display or a television receiver. A prior art microcomputer internally including an OSD controller comprises a dedicated oscillation circuit used for only the OSD controller and another dedicated oscillation circuit used for only the other circuits including a CPU, in order to elevate an OSD display quality, or alternatively an oscillation circuit provided in common to the OSD controller and the other circuits including the CPU, in order to commonly use external terminals to reduce the number of required external terminals.

Referring to FIG. 1, there is shown a block diagram of an oscillation source portion of a first example of the prior art microcomputer. The shown prior art microcomputer is generally designated with Reference Numeral 10, and includes a dedicated oscillation circuit 12 used for only an OSD controller 14 and another dedicated oscillation circuit 16 used for only the other circuits 18 including a CPU. The oscillation circuit 12 is connected through a pair of external terminals 20 and 22 to an external oscillator (not shown) such as a quartz crystal resonator, to generate a clock signal in cooperation with the external oscillator, and also connected through another external terminal 24 to receive a horizontal synchronous signal Hsync, so that the oscillation circuit 12 is controlled by the horizontal synchronous signal Hsync. On the other hand, the oscillation circuit 16 is connected through a pair of external terminals 26 and 28 to another external oscillator (not shown) to generate a clock signal in cooperation with the external oscillator Referring to FIG. 2, there is shown a timing chart illustrating an operation of the oscillation source portion of the first example of the prior art microcomputer shown in FIG. 1. As seen from FIG. 2, when the horizontal synchronous signal Hsync becomes active, the oscillation circuit 12 for the OSD controller stops its oscillation at once, as shown by "a" in FIG. 2, and restarts the oscillation as soon as the horizontal synchronous signal Hsync is rendered inactive, so that an output of the oscillation circuit 12 is synchronized with the horizontal synchronous signal Hsync. On the other hand, the oscillation circuit 16 for the other circuits 18 including the CPU, oscillates independently of the oscillation circuit 12 for the OSD controller 14.

Referring to FIG. 3, there is shown a block diagram of an oscillation source portion of a second example of the prior art microcomputer. The shown prior art microcomputer is generally designated with Reference Numeral 30, and includes an oscillation circuit 32 provided in common to an OSD controller 34 and the other circuits 36 including a CPU. The oscillation circuit 32 is connected through a pair of external terminals 38 and 40 to for example an external oscillator (not shown) such as a quartz crystal resonator, and on the other hand, a horizontal synchronous signal Hsync is supplied through another external terminal 42 to the OSD controller 34, but is not supplied to the oscillation circuit 32.

Referring to FIG. 4, there is shown a timing chart illustrating an operation of the oscillation source portion of the first example of the prior art microcomputer shown in FIG. 1. As shown in FIG. 2, the oscillation circuit 32 operates asynchronously with the horizontal synchronous signal Hsync. Therefore, the oscillation circuit 32 does not executes the stopping and the restarting of the oscillation, differently from the first example of the prior art microcomputer shown in FIG. 1.

The above mentioned prior art microcomputers have the following problems:

A first problem is that, in order to elevate the OSD display quality, a number of external terminals are required for the microcomputer, and a noise countermeasure of a peripheral circuit becomes complicated. An increased number of peripheral circuit parts required to compensate for shortage of the external terminal number and for conducting the noise countermeasure, results in an elevated cost and in an increased mounting area. This is hindrance in miniaturization and in a cost-down of the product.

The reason for this is that: If a time difference between a transition of the horizontal synchronous signal Hsync and a transition of the clock generated in the oscillation circuit is different from one horizontal period to another as shown in FIG. 4, a deviation occurs on the OSD, with the result that the OSD display quality is deteriorated. This deviation will be called a "horizontal deviation".

In order to prevent this horizontal deviation, the oscillation circuit is stopped and then caused to restart the oscillation at each horizontal synchronous signal, as the oscillation circuit 12 in the first example of the prior art microcomputer shown in FIG. 1.

However, if a "spike noise" occurs as shown by "b" in FIG. 2 as the result of a sudden stop of the supplying of the clock, there is possibility that the other circuits including the CPU cause malfunction. Because of this, the OSD controller 14 and the other circuits 18 including the CPU are required to have the dedicated oscillation circuits 12 and 16, respectively.

A second problem is that: If external terminals are used in common in order to reduce the number of external terminals, the OSD display quality is deteriorated. Because, if the oscillation circuit is used in common to the OSD controller and the other circuits including the CPU, the output of the oscillation circuit is not synchronized with the horizontal synchronous signal, with the result that the horizontal deviation occurs in the OSD controller as mentioned hereinbefore.

SUMMARY OF THE INVENTION

Accordingly, it is an object of the present invention to provide a microcomputer internally including an OSD controller, which has overcome the above mentioned defects of the conventional ones.

Another object of the present invention is to provide a microcomputer internally including an OSD controller, which omits external terminals and external parts, which were provided in the prior art for only the OSD controller, with maintaining the OSD display quality.

The above and other objects of the present invention are achieved in accordance with the present invention by a microcomputer internally comprising:

- a circuit including a central processing unit and operating in synchronism with an internal clock signal;
- a controller operating in synchronism with the internal clock signal and an synchronous signal having a constant period supplied from an external device;

an oscillation circuit coupled to an external oscillator, for generating the internal clock signal to both the circuit and the controller; and means receiving the synchronous signal for generating a CPU stop request signal to the circuit before supply of the synchronous signal so that the circuit generates a CPU stop signal to the means, the means causing the oscillation circuit to stop generation of the internal clock signal when the means receives the CPU stop signal, the means also causing the oscillation circuit to restart the generation of the internal clock signal when the means receives the synchronous signal as an oscillation restart signal, whereby the internal clock signal is generated in synchronism with the synchronous signal.

In one preferred embodiment, the means includes:

a reference value holding means holding a reference value;

a counting means initialized with each synchronous signal and counting the internal clock signal;

a comparing means comparing a count value of the counting means with the reference value of the reference value holding means, for generating an equal signal when the count value of the counting means becomes coincident with the reference value of the reference value holding means;

a stop requesting means responding to the equal signal to generating the CPU stop request signal to the circuit; and an oscillation controlling means responding to the CPU stop signal to generate an oscillation stop signal to the oscillation circuit thereby to cause the oscillation circuit to stop the generation of the internal clock signal, the oscillation controlling means also responding to each synchronous signal as an oscillation restart signal, to deactivate the oscillation stop signal thereby to cause the oscillation circuit to restart the generation of the internal clock signal.

In another preferred embodiment, the means further includes:

a flag means set by the circuit with a flag signal indicating whether or not there is executed the oscillation stopping and restarting function in response to each synchronous signal, the stop requesting means and the oscillation controlling means being put into a disabled condition by the flag means when the flag means is set with an inactive flag signal indicating that there is not to be executed the oscillation stopping and restarting function in response to each synchronous signal; and a holding means for holding the count value of the counting means just before the counting means is initialized, the value of the holding means being supplied to the circuit.

When the flag means is set with the inactive flag signal, the circuit sets the reference value in the reference value holding means on the basis of the value of the holding means, and after the flag means is set with an active flag signal indicating that there is to be executed the oscillation stopping and restarting function in response to each synchronous signal, the stop requesting means and the oscillation controlling means are put into an enabled condition, so that the oscillation stopping and restarting function is executed in response to each synchronous signal.

In still another preferred embodiment, the means further includes:

a delay means receiving the equal signal to output a delayed equal signal; and a logical OR means receiving the synchronous signal and the delayed equal signal to output an logical OR output signal, as the oscillation restart signal, to the oscillation controlling means, whereby, even if the synchronous signal is stopped, the oscillation stopping and restarting function is repeated.

In a specific embodiment, the controller is a controller for an on screen display, and the synchronous signal is a horizontal synchronous signal for the on screen display.

The above and other objects, features and advantages of the present invention will be apparent from the following description of preferred embodiments of the invention with reference to the accompanying drawings.

DESCRIPTION OF THE PREFERRED EMBODIMENTS

Figure 1:
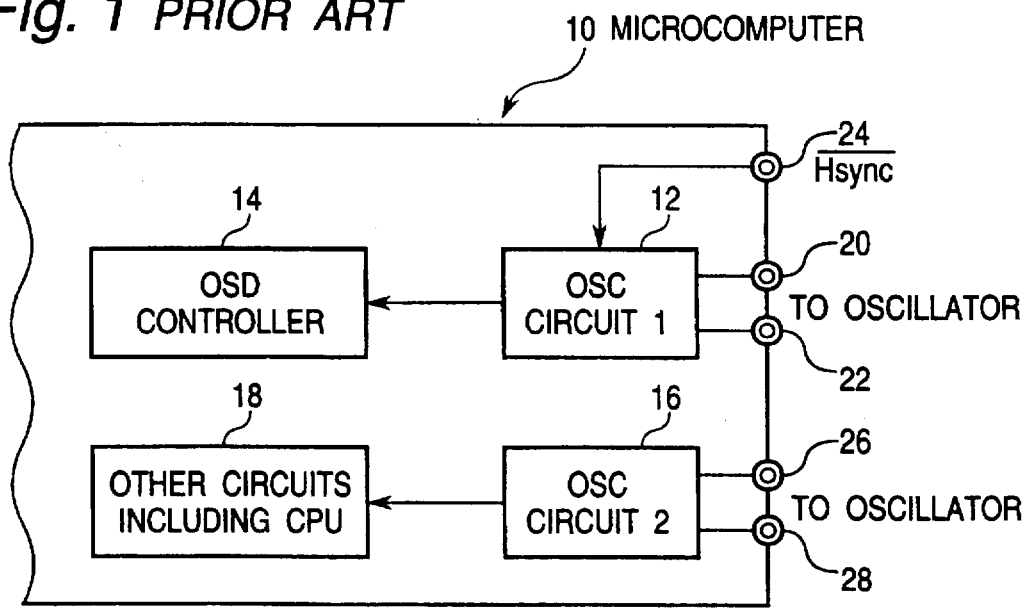
FIG. 1 is a block diagram of an oscillation source portion of a first example of the prior art microcomputer.
Figure 2:
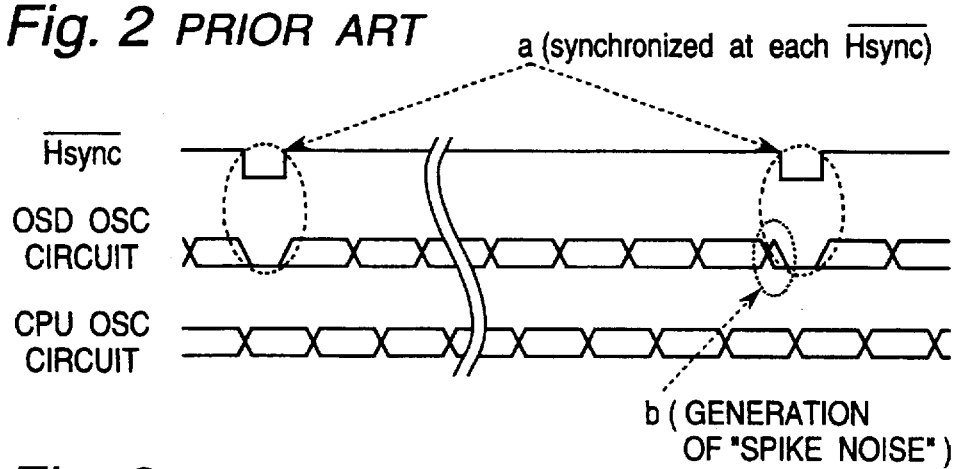
FIG. 2 is a timing chart illustrating an operation of the oscillation source part of the first example of the prior art microcomputer shown in FIG. 1.
Figure 3:
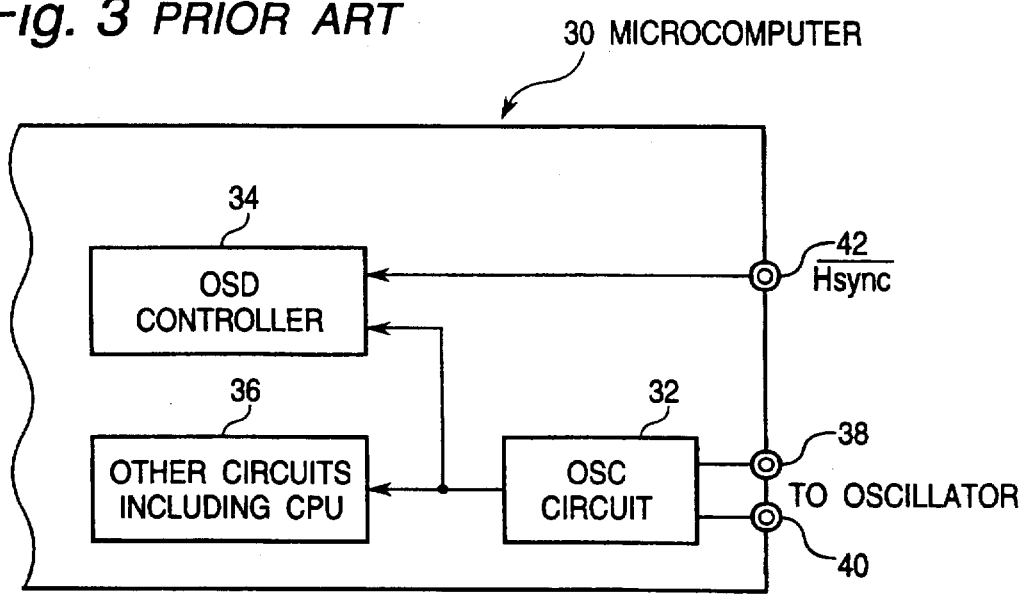
FIG. 3 is a block diagram of an oscillation source portion of a second example of the prior art microcomputer.
Figure 4:
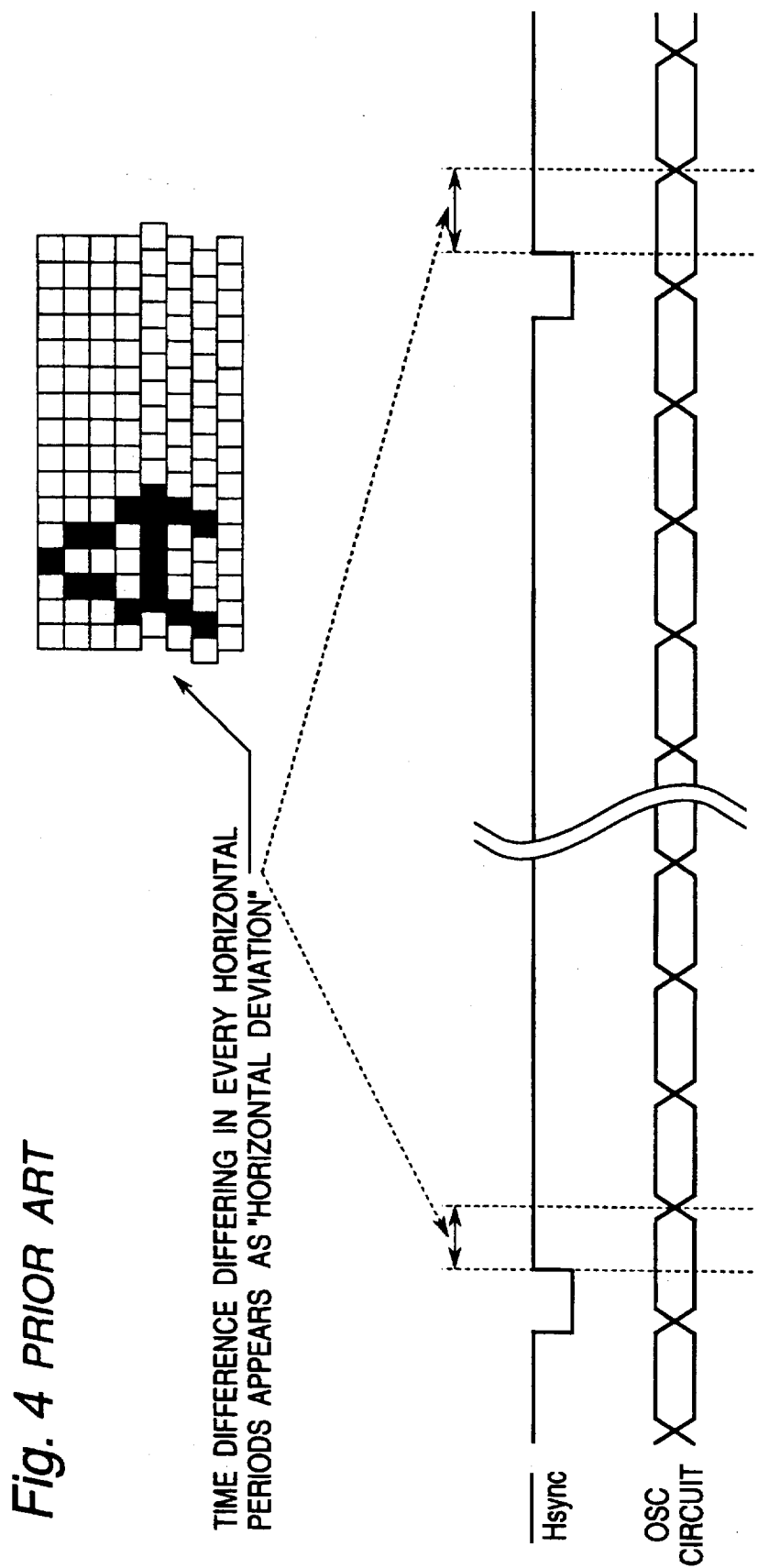
FIG. 4 is a timing chart illustrating an operation of the oscillation source portion of the second example of the prior art microcomputer shown in FIG. 3.
Figure 5:
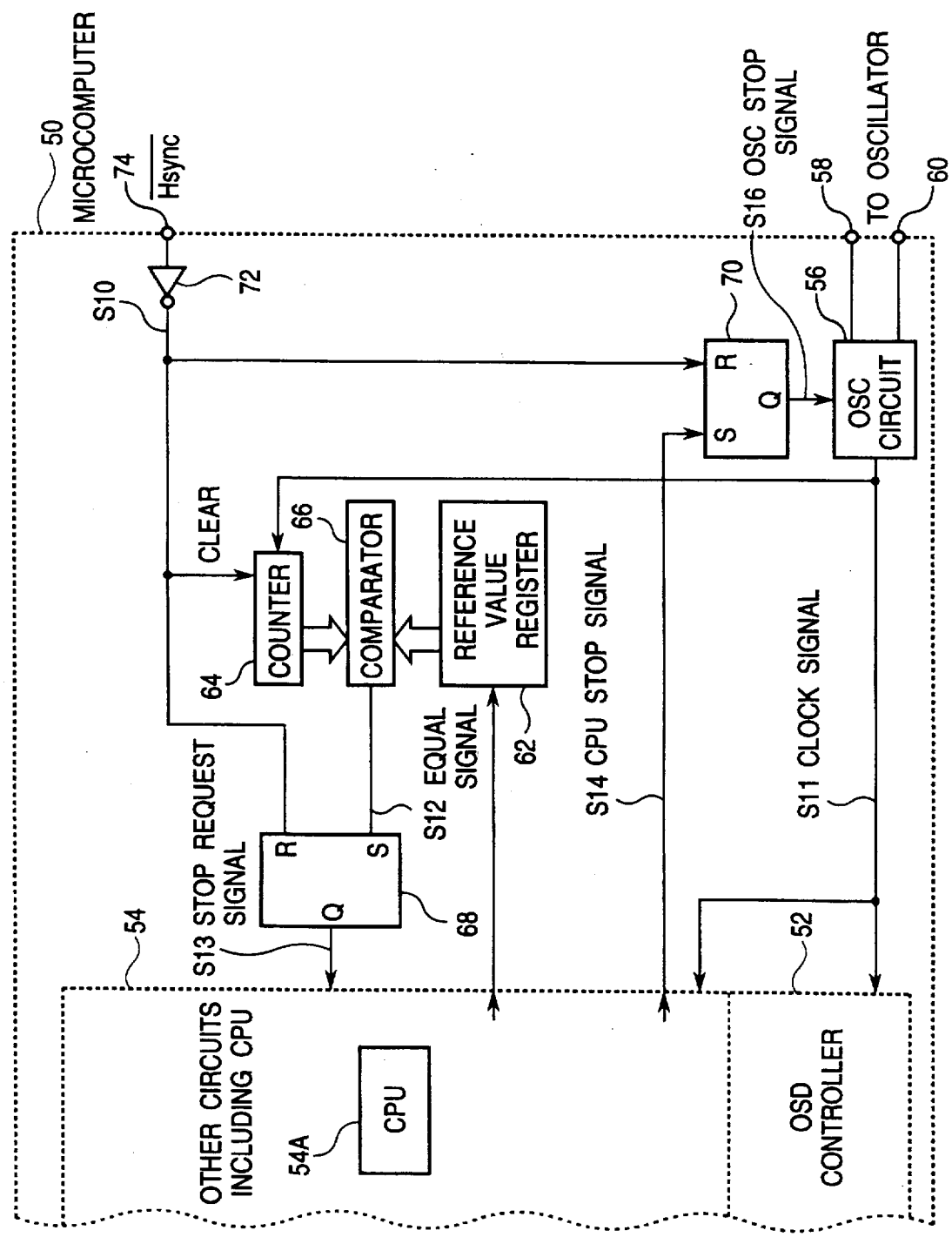
FIG. 5 is a block diagram of an oscillation source portion of a first embodiment of the microcomputer in accordance with the present invention.

Referring to FIG. 5, there is shown a block diagram of an oscillation source portion of a first embodiment of the microcomputer in accordance with the present invention.

The shown microcomputer is generally designated with Reference Numeral 50, and an OSD controller is designated with Reference Numeral 52, and the other circuits including a CPU is designated with Reference Numeral 54. The CPU is designated with Reference Numeral 54A. The oscillation source portion comprises an oscillation circuit 56 for generating a clock signal S11, which is supplied to both the OSD controller 52 and the other circuits 54 including the CPU 54A. This oscillation circuit 56 is connected through a pair of external terminals 58 and 60 to an external oscillator (not shown) such as a quartz crystal resonator. In addition to the oscillation circuit 56, the oscillation source portion also comprises a reference value register 62, a counter 64, a comparator 66, a stop request circuit 68, and an oscillation control circuit 70.

The reference value register 62 is previously set with a reference value by the CPU 54A. The counter 64 is initialized by an internal inverted horizontal synchronous signal S10 outputted from an inverting buffer 72, which has an input connected to an external terminal 74 receiving an external horizontal synchronous signal $\overline{Hsync}$. The counter 64 is also connected to receive and count the clock signal S11 generated by the oscillation circuit 56. The comparator 66 compares a count value of the counter 64 with the reference value of the register 62, and generates an equal signal S12 when the count value of the counter 64 becomes coincident with the reference value of the register 62.

The stop request circuit 68 is constituted of a set-reset flipflop having a set input connected to receive the equal signal S12 and a reset input connected to receive the internal inverted horizontal synchronous signal S10. In response to the equal signal S12, the request circuit (flipflop) 68 generates a CPU stop request signal S13 to the other circuits 54 including the CPU, in order to request the other circuits 54 including the CPU 54A, to stop their operation. When the other circuits 54 including the CPU 54A actually stop their operation, the other circuits 54 including the CPU 54A generates a CPU stop signal S14.

The oscillation control circuit 70 is constituted of a set-reset flipflop having a set input connected to receive the CPU stop signal S14 and a reset input connected to receive the internal inverted horizontal synchronous signal S10 as an oscillation restart signal. In response to the CPU stop signal S13, the control circuit (flipflop) 70 generates an oscillation stop signal S16 to the oscillation circuit 56, in order to request the oscillation circuit 56 to stop generation of the clock signal S11. On the other hand, in response to the internal inverted horizontal synchronous signal S10, the control circuit (flipflop) 70 deactivates the oscillation stop signal S16 so that the oscillation circuit 56 restarts the generation of the clock signal S11.

Now, an operation of the oscillation source portion of the first embodiment of the microcomputer in accordance with the present invention will be described with reference to FIG. 6, which is a timing chart illustrating an operation of the oscillation source portion of the first embodiment of the microcomputer shown in FIG. 5.

First, the operation of the oscillation source portion is based on the premise that the external horizontal synchronous signal Hsync is supplied uninterruptedly at a constant period. On the other hand, the reference value register 62 is previously set with a fixed value ("n" in FIG. 6) which is obtained by subtracting the number of the clock signals S11 from the moment the other circuits 54 including the CPU 54A receives the stop request signal S13 to the moment the other circuits 54 including the CPU 54A generates the CPU stop signal S14 (this will be called a "CPU stopping clock number" hereinafter), from the number of the clock signals S11 corresponding to one period of the external horizontal synchronous signal Hsync.

First, when the external horizontal synchronous signal Hsync is activated to a logical low level (namely, the internal horizontal synchronous signal S10 is activated to a logical high level), the counter 64 is cleared and initialized to count the clock signal S11 generated in the oscillation circuit 56, during an inactive period of the external horizontal synchronous signal Hsync. The comparator 66 compares the count value of the counter 64 with the reference value ("n") of the register 62, and generates the equal signal S12 when the count value of the counter 64 becomes coincident with the reference value ("n") of the register 62. In response to the equal signal S12, the stop request circuit 68 outputs the stop request signal S13 to the other circuits 54 including the CPU 54A. In response to the stop request signal S13, the other circuits 54 including the CPU 54A enters a stopping processing, and when the stopping processing is completed, the other circuits 54 including the CPU 54A generates the CPU stop signal S14 to the oscillation control circuit 70.

In response to the CPU stop signal S14, the oscillation control circuit 70 activates the oscillation stop signal S16 supplied the oscillation circuit 56, to bring the oscillation circuit 56 into an oscillation stop condition. When the external horizontal synchronous signal Hsync and hence the internal horizontal synchronous signal S10 changes from an inactive condition to an activate condition, the internal horizontal synchronous signal S10 resets the oscillation control circuit 70 to cause the oscillation circuit 56 to restart the generation of the clock signal S11. At the same time, the counter 64 is cleared and initialized by the internal horizontal synchronous signal S10.

Figure 6:
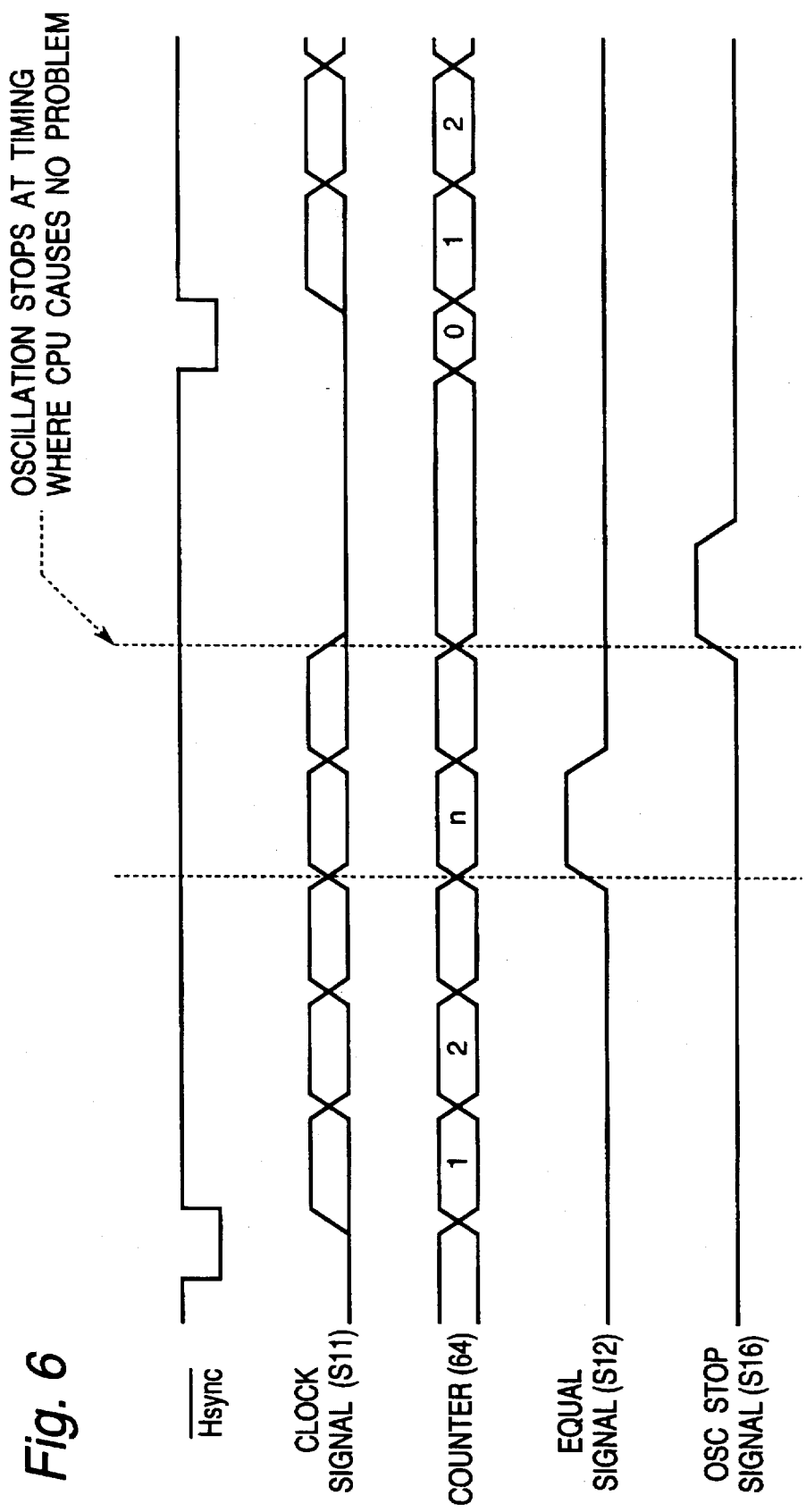
FIG. 6 is a timing chart illustrating an operation of the oscillation source portion of the first embodiment of the microcomputer shown in FIG. 5.

Thus, as seen from FIG. 6, the above mentioned stopping and restarting of the oscillation of the oscillation circuit 56 is repeated, namely, stop and generation of the clock signal S11 is repeated, at each period of the external horizontal synchronous signal Hsync. Thus, the clock signal S11 in synchronism with the external horizontal synchronous signal Hsync is supplied to the OSD controller 52, with the result that it is possible to avoid the deterioration of the display quality which is otherwise caused by the horizontal deviation. On the other hand, since the oscillation of the oscillation circuit 56 is stopped at a timing which is not inconvenient to the CPU, namely which gives no adverse influence on the CPU, there occurs no CPU malfunction such as the "spike noise".

Furthermore, since the oscillation circuit 56 is used in common to the OSD controller 52 and the other circuits 54 including the CPU 54A, it is possible to reduce the number of required external terminals. In addition, since the number of external oscillators to be externally connected to the microcomputer can be reduced from two to one, the noise countermeasure can become easy, and at the same time, the number of external circuit parts can be reduced, resulting in reduction of the cost.

Figure 7:
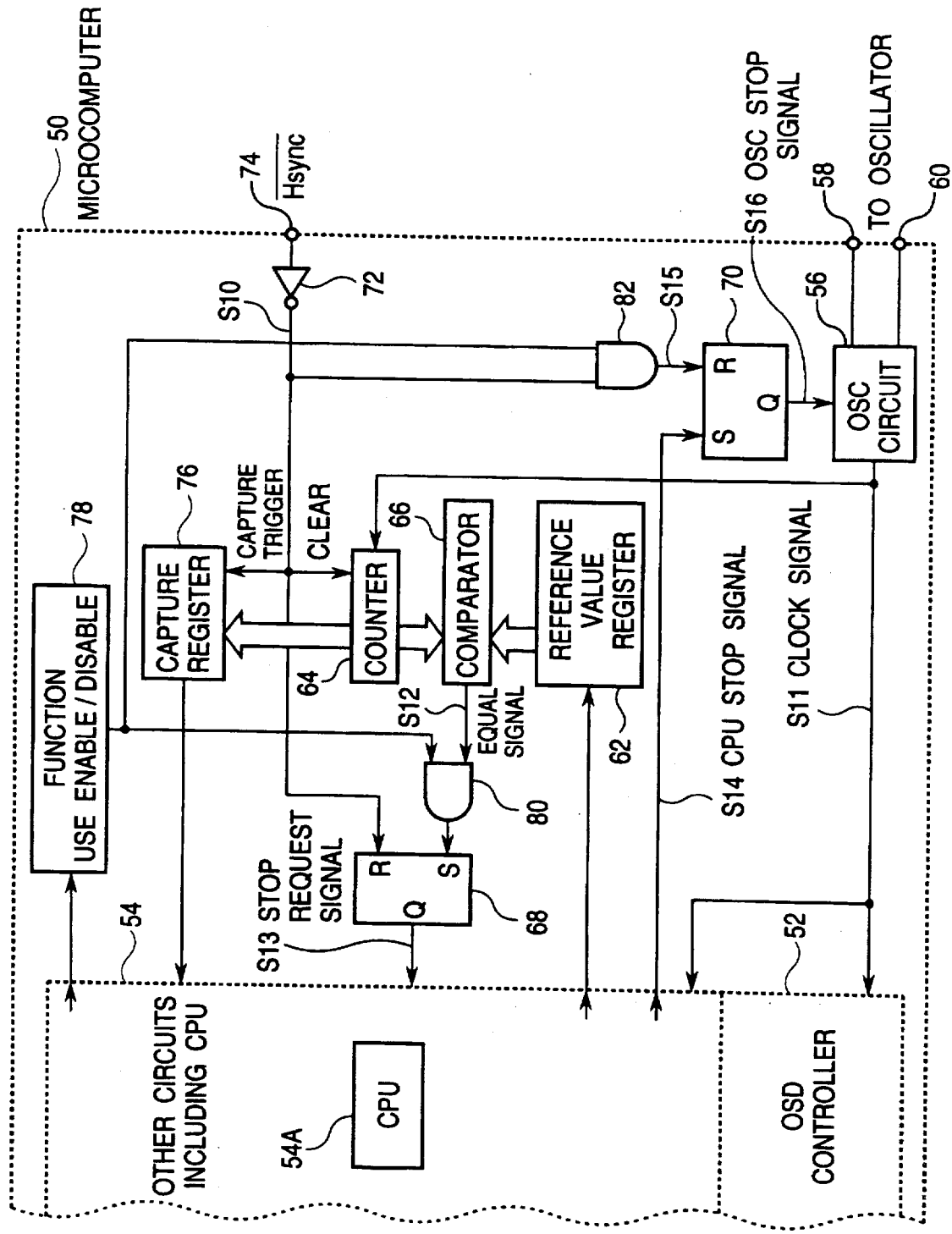
FIG. 7 is a block diagram of an oscillation source portion of a second embodiment of the microcomputer in accordance with the present invention.

Referring to FIG. 7, there is shown is a block diagram of an oscillation source portion of a second embodiment of the microcomputer in accordance with the present invention. In FIG. 7, elements similar to those shown in FIG. 5 are given the same Reference Numerals, and explanation thereof will be omitted for simplification of description.

As seen from comparison between FIGS. 5 and 7, the second embodiment shown in FIG. 7 includes a capture register 76, a flag circuit 78 and AND gates 80 and 82, in addition to those included in the first embodiment.

The capture register 76 captures and stores the count value of the counter 64 just before the counter 64 is initialized. The count value captured and stored in the capture register 76 is indicative of the constant period of the external horizontal synchronous signal Hsync in term of the number of the clock signals S11, and is read out from the other circuits 54 including the CPU 54A.

The flag circuit 78 is set by the CPU 54A with a flag signal which indicates whether or not the function of the shown oscillation source portion is used. The AND gate 80 receives an output of the flag circuit 78 and the equal signal S12 outputted from the comparator 62, and an output of the AND gate 80 is connected to the set input of the stop request circuit (flipflop) 68. Therefore, the AND gate 80 masks the equal signal S12 supplied to the set input of the request circuit (flipflop) 68, by the flag signal set in the flag circuit 78.

The AND gate 82 receives the output of the flag circuit 78 and the internal horizontal synchronous signal S10, and an output of the AND gate 82 is connected to the reset input of the oscillation control circuit (flipflop) 70. Therefore, the AND gate 82 masks the internal horizontal synchronous signal S10 supplied as the oscillation restart signal to the reset input of the oscillation control circuit (flipflop) 70, by the flag signal set in the flag circuit 78. Thus, when the flag signal set in the flag circuit 78 is at a logical low level ("0"), the stop request circuit (flipflop) 68 and the oscillation control circuit (flipflop) 70 are maintained in an inoperable condition. Accordingly, the stop request circuit (flipflop) 68 and the oscillation control circuit (flipflop) 70 are selectively maintained either in an activated condition or in a deactivated condition by controlling the flag signal.

Now, an operation of the oscillation source portion of the second embodiment of the microcomputer in accordance with the present invention will be described.

First, the CPU 54A sets "0" into the flag circuit 78 which indicates whether or not the function of the shown oscillation source portion is used. Therefore, the equal signal S12 and the internal horizontal synchronous signal S10 are masked by the AND gates 80 and 82, respectively, so that the equal signal S12 and the internal horizontal synchronous signal S10 are no longer supplied to the stop request circuit (flipflop) 68 and the oscillation control circuit (flipflop) 70, respectively. As a result, the oscillation stopping and restarting function of the shown oscillation source portion is put into a disable condition. Therefore, the oscillation circuit 56 continues to oscillate.

On the other hand, at each time the external horizontal synchronous signal Hsync is supplied, the count value of the counter 64 just before the counter 64 is initialized, is captured and sampled by the capture register 76, and therefore, the CPU 54A obtains the number of the clock signals corresponding to one period of the current horizontal synchronous signal Hsync. Furthermore, the CPU 54A subtracts the above mentioned "CPU stopping clock number" from the obtained number of clock signals, and stores the value of the subtraction result into the reference value register 62.

Thereafter, the CPU 54A changes and sets the value of the flag circuit 78 to "1", so as to cancel the masking of the AND gates 80 and 82. As a result, the second embodiment operates similarly to the first embodiment.

In the oscillation source portion of the second embodiment of the microcomputer in accordance with the present invention, the reference value is set as a variable corresponding to one period of the horizontal synchronous signal Hsync. Accordingly, the oscillation source portion of the second embodiment can be applied to an application having a plurality of different horizontal synchronous signal periods, and the oscillation source portion of the second embodiment can select the frequency of the clock oscillation circuit, independently of the horizontal synchronous signal.

Figure 8:
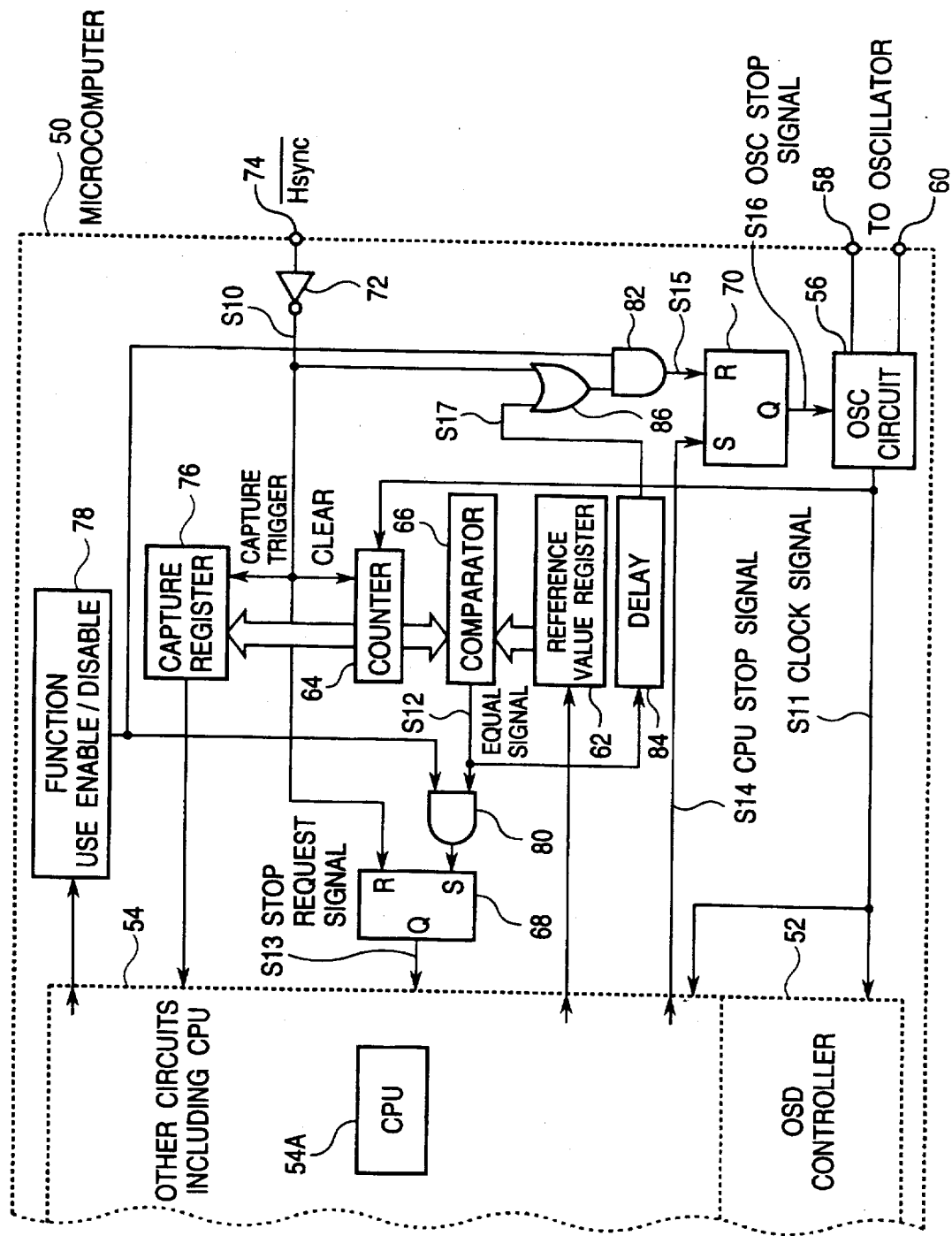
FIG. 8 is a block diagram of an oscillation source portion of a third embodiment of the microcomputer in accordance with the present invention.

Referring to FIG. 8, there is shown is a block diagram of an oscillation source portion of a third embodiment of the microcomputer in accordance with the present invention. In FIG. 8, elements similar to those shown in FIG. 7 are given the same Reference Numerals, and explanation thereof will be omitted for simplification of description.

As seen from comparison between FIGS. 7 and 8, the third embodiment shown in FIG. 8 includes a delay circuit 84 and an OR gate 86, in addition to those included in the second embodiment.

The delay circuit 84 receives the equal signal S12, and outputs a delayed equal signal S17. A delay time of the delay circuit 84 is set to be not shorter than a time corresponding to the number of clock signals required for a stopping processing of the other circuits 54 including the CPU 54A, added with a tolerance time for a deviation of the horizontal synchronous signal S10 or Hsync. The OR gate 86 receives the delayed equal signal S17 and the internal horizontal synchronous signal S10, and outputs a logical OR output to the AND gate 82, so that the logical OR output is supplied to the reset input of the oscillation control circuit (flipflop) 70 as the oscillation restart signal.

Now, an operation of the oscillation source portion of the third embodiment of the microcomputer in accordance with the present invention will be described, assuming that the flag circuit 78 is already set to "1" to cancel the masking of the AND gates 80 and 82.

When the count value of the counter 64 becomes coincident with the reference value of the register 62, the comparator 66 generates the equal signal S12. In response to this equal signal S12, the delay circuit 84 outputs the delayed equal signal S17 after the delay time which is not shorter than the time corresponding to the number of clock signals required for the stopping processing of the other circuits 54 including the CPU 54A, added with the tolerance time for the deviation of the horizontal synchronous signal S10 or Hsync. This delayed equal signal S17 is supplied to the OR gate 86, which generates the logical OR output of the delayed equal signal S17 and the internal horizontal synchronous signal S10, to the oscillation control circuit 70 as the oscillation restart signal.

In this third embodiment, thus, even if the internal horizontal synchronous signal S10 is stopped after the CPU is stopped, the CPU can be restarted after a time corresponding to the delay time of the delay circuit 84.

Accordingly, the third embodiment shown in FIG. 8 can cope with an unexpected trouble such as the stopping of the horizontal synchronous signal S10 or Hsync.

The first, second and third embodiments of the present invention have been described in the case of the microcomputer internally including the OSD controller. However, in the case that when a microcomputer and a peripheral device externally connected to the microcomputer are realized on a single chip with an advanced semiconductor device design technology, a noise countermeasure and shortage in the number of external terminals occur necessarily. The present invention can be effectively used in this situation.

As seen from the above, the microcomputer in accordance with the present invention can reduce the number of external terminals and the number of external parts, without lowering the OSD display quality, and therefore, the external terminals can be used for another use purpose. The reason for this advantage is that the same clock signal is supplied in common to the OSD controller and the other circuits including the CPU, and also controlled on the basis of the horizontal synchronous signal with giving no adverse influence to the other circuits including the CPU.

Furthermore, in a system including the microcomputer in accordance with the present invention, the noise countermeasure becomes easy, and therefore, the cost of the system can be reduced. The reason for this is that, since the same clock signal is supplied in common to the OSD controller and the other circuits including the CPU, the number of high frequency oscillation circuits can be reduced.

The invention has thus been shown and described with reference to the specific embodiments. However, it should be noted that the present invention is in no way limited to the details of the illustrated structures but changes and modifications may be made within the scope of the appended claims.

I claim:

1. A microcomputer internally comprising:

a circuit including a central processing unit and operating in synchronism with an internal clock signal;

a controller operating in synchronism with the internal clock signal and a synchronous signal having a constant period supplied from an external device;

an oscillation circuit coupled to an external oscillator, for generating said internal clock signal to both said circuit and said controller; and means receiving said synchronous signal for generating a CPU stop request signal to said circuit before supply of said synchronous signal so that said circuit generates a CPU stop signal to said means, said means causing said oscillation circuit to stop generation of said internal clock signal when said means receives said CPU stop signal, said means also causing said oscillation circuit to restart the generation of said internal clock signal when said means receives said synchronous signal as an oscillation restart signal, whereby said internal clock signal is generated in synchronism with said synchronous signal.

2. A microcomputer claimed in claim 1 wherein said means includes:

a reference value holding means holding a reference value;

a counting means initialized with each synchronous signal and counting said internal clock signal;

a comparing means comparing a count value of said counting means with said reference value of said reference value holding means, for generating an equal signal when said count value of said counting means becomes coincident with said reference value of said reference value holding means;

a stop requesting means responding to said equal signal to generating said CPU stop request signal to said circuit; and an oscillation controlling means responding to said CPU stop signal to generate an oscillation stop signal to said oscillation circuit thereby to cause said oscillation circuit to stop the generation of said internal clock signal, said oscillation controlling means also responding to each synchronous signal as an oscillation restart signal, to deactivate said oscillation stop signal thereby to cause said oscillation circuit to restart the generation of said internal clock signal.

3. A microcomputer claimed in claim 2 wherein said means further includes:

a flag means set by said circuit with a flag signal indicating whether or not there is executed the oscillation stopping and restarting function in response to each synchronous signal, said stop requesting means and said oscillation controlling means being put into a disabled condition by said flag means when said flag means is set with an inactive flag signal indicating that there is not to be executed the oscillation stopping and restarting function in response to each synchronous signal; and a holding means for holding the count value of said counting means just before said counting means is initialized, the value of said holding means being supplied to said circuit, and wherein when said flag means is set with said inactive flag signal, said circuit sets said reference value in said reference value holding means on the basis of the value of said holding means, and after said flag means is set with an active flag signal indicating that there is to be executed the oscillation stopping and restarting function in response to each synchronous signal, said stop requesting means and said oscillation controlling means are put into an enabled condition, so that the oscillation stopping and restarting function is executed in response to each synchronous signal.

4. A microcomputer claimed in claim 3 wherein said means further includes:

a delay means receiving said equal signal to output a delayed equal signal; and a logical OR means receiving said synchronous signal and said delayed equal signal to output an logical OR output signal, as said oscillation restart signal, to said oscillation controlling means, whereby, even if said synchronous signal is stopped, the oscillation stopping and restarting function is repeated.

5. A microcomputer claimed in claim 4 wherein said controller is a controller for an on screen display, and said synchronous signal is a horizontal synchronous signal for said on screen display.

6. A microcomputer claimed in claim 2 wherein said stop requesting means is composed of a first set-reset flipflop having a set input connected to receive said equal signal and a reset input connected to said synchronous signal, an output of said first set-reset flipflop generating said CPU stop request signal, and said oscillation controlling means is composed of a second set-reset flipflop having a set input connected to receive said CPU stop signal and a reset input connected to said synchronous signal, an output of said second set-reset flipflop generating said oscillation stop signal.

7. A microcomputer claimed in claim 6 wherein said means further includes:

a flag means set by said circuit with a flag signal indicating whether or not there is executed the oscillation stopping and restarting function in response to each synchronous signal;

a first AND gate having a first input connected to an output of said flag means and a second input connected to said equal signal, an output of said first AND gate being connected to said set input of said first set-reset flipflop, so that said stop requesting means is put into a disabled condition by said flag means when said flag means is set with an inactive flag signal indicating that there is not to be executed the oscillation stopping and restarting function in response to each synchronous signal;

a second AND gate having a first input connected to said output of said flag means and a second input connected to said synchronous signal, an output of said second AND gate being connected to said reset input of said second set-reset flipflop, so that said oscillation controlling means is put into a disabled condition by said flag means when said flag means is set with said inactive flag signal; and a capture register responding to each synchronous signal for holding the count value of said counting means just before said counting means is initialized, the value of said capture register being supplied to said circuit, and wherein when said flag means is set with said inactive flag signal, said circuit sets said reference value in said reference value holding means on the basis of the value of said capture register, and after said flag means is set with an active flag signal indicating that there is to be executed the oscillation stopping and restarting function in response to each synchronous signal, said stop requesting means and said oscillation controlling means are put into an enabled condition, so that the oscillation stopping and restarting function is executed in response to each synchronous signal.

8. A microcomputer claimed in claim 7 wherein said means further includes:

a delay means receiving said equal signal to output a delayed equal signal; and an OR gates receiving said synchronous signal and said delayed equal signal to output an logical OR output signal, as said oscillation restart signal, to said second input of said second AND gate, whereby, even if said synchronous signal is stopped, the oscillation stopping and restarting function is repeated.

* * * * *